United States Patent
Fink et al.

(10) Patent No.: US 10,839,551 B2
(45) Date of Patent: Nov. 17, 2020

(54) AUGMENTATION OF 3-D POINT CLOUDS WITH SUBSEQUENTLY CAPTURED DATA

(71) Applicant: STREEM, INC., Portland, OR (US)

(72) Inventors: Ryan R. Fink, Vancouver, WA (US); Sean M. Adkinson, North Plains, OR (US)

(73) Assignee: STREEM, INC., Portland, OR (US)

( * ) Notice: Subject to any disclaimer, the term of this patent is extended or adjusted under 35 U.S.C. 154(b) by 81 days.

(21) Appl. No.: 16/389,372

(22) Filed: Apr. 19, 2019

(65) Prior Publication Data
US 2019/0325604 A1    Oct. 24, 2019

Related U.S. Application Data

(60) Provisional application No. 62/660,737, filed on Apr. 20, 2018.

(51) Int. Cl.
| | |
|---|---|
| G06T 7/73 | (2017.01) |
| H04N 5/262 | (2006.01) |
| G06T 19/00 | (2011.01) |
| G06T 7/579 | (2017.01) |
| G06T 7/521 | (2017.01) |
| G06T 7/593 | (2017.01) |

(52) U.S. Cl.
CPC ............ *G06T 7/73* (2017.01); *G06T 7/521* (2017.01); *G06T 7/579* (2017.01); *G06T 7/593* (2017.01); *G06T 19/006* (2013.01); *H04N 5/2628* (2013.01); *G06T 2207/10028* (2013.01)

(58) Field of Classification Search
CPC ......... G06T 7/593; G06T 7/521; G06T 17/00; G06T 19/006; G06T 7/579; G06T 7/73; G06T 2207/10028; G06T 2210/56; G06T 2207/30244; H04N 5/2628
See application file for complete search history.

(56) References Cited

U.S. PATENT DOCUMENTS

| | | | |
|---|---|---|---|
| 2018/0232954 A1* | 8/2018 | Frank | G06T 19/00 |
| 2018/0374269 A1* | 12/2018 | Smith | G06K 7/1417 |
| 2020/0020137 A1* | 1/2020 | Daniels | G06K 9/46 |

* cited by examiner

*Primary Examiner* — Brenda C Bernardi
(74) *Attorney, Agent, or Firm* — Schwabe, Williamson & Wyatt, P.C.

(57) ABSTRACT

Methods for augmentation of previously captured augmented reality data with subsequently captured data are disclosed. A subsequent capture of a scene and associated AR data, such as a point cloud, may be correlated with the previously captured data by various methods, including image matching, object recognition, and geolocation referencing. Following correlation, the previously captured data may be augmented by the AR data from the subsequent capture, which may include adding or deleting points. Some existing points may be modified in some aspects where a subsequent capture includes more reliable data.

12 Claims, 6 Drawing Sheets

NON-TRANSITORY COMPUTER-READABLE STORAGE MEDIUM
602

PROGRAMMING INSTRUCTIONS 604,
CONFIGURED TO CAUSE A DEVICE, IN RESPONSE TO EXECUTION OF THE PROGRAMMING INSTRUCTIONS, TO PRACTICE (ASPECTS OF) EMBODIMENTS OF THE PROCESS(ES) DESCRIBED THROUGHOUT THIS DISCLOSURE.

FIG. 6

AUGMENTATION OF 3-D POINT CLOUDS WITH SUBSEQUENTLY CAPTURED DATA

CROSS-REFERENCE TO RELATED APPLICATIONS

This application claims the benefit of U.S. Provisional Application No. 62/660,737, filed on Apr. 20, 2018, the entire contents of which are hereby incorporated by reference herein.

TECHNICAL FIELD

The present disclosure relates to the field of augmented reality (AR), and specifically to augmenting captured 3-D point data associated with a specific image or view with related subsequently captured data.

BACKGROUND

Devices such as smartphones and tablets are increasingly capable of supporting augmented reality (AR). These devices may capture images and/or video and, depending upon the particulars of a given AR implementation, the captured images or video may be processed using various algorithms to detect features in the video, such as planes, surfaces, faces, and other recognizable shapes. These detected features, combined in some implementations with data from depth sensors or motion information captured from motion sensors such as a MEMS gyroscope and accelerometers, can facilitate AR software in creating a point cloud in a three-dimensional space. This point cloud enables AR-based applications to generate and place virtual objects within a 3-D space represented by the captured images and/or video. These point clouds may be associated and stored with their source images, video, and/or depth or motion data.

BRIEF DESCRIPTION OF THE DRAWINGS

Embodiments will be readily understood by the following detailed description in conjunction with the accompanying drawings. Embodiments are illustrated by way of example and not by way of limitation in the figures of the accompanying drawings.

FIG. 6 is a block diagram of a computer-readable storage medium that can be used to implement some of the components of the system or methods disclosed herein, according to various embodiments.

DETAILED DESCRIPTION OF DISCLOSED EMBODIMENTS

Figure 1:
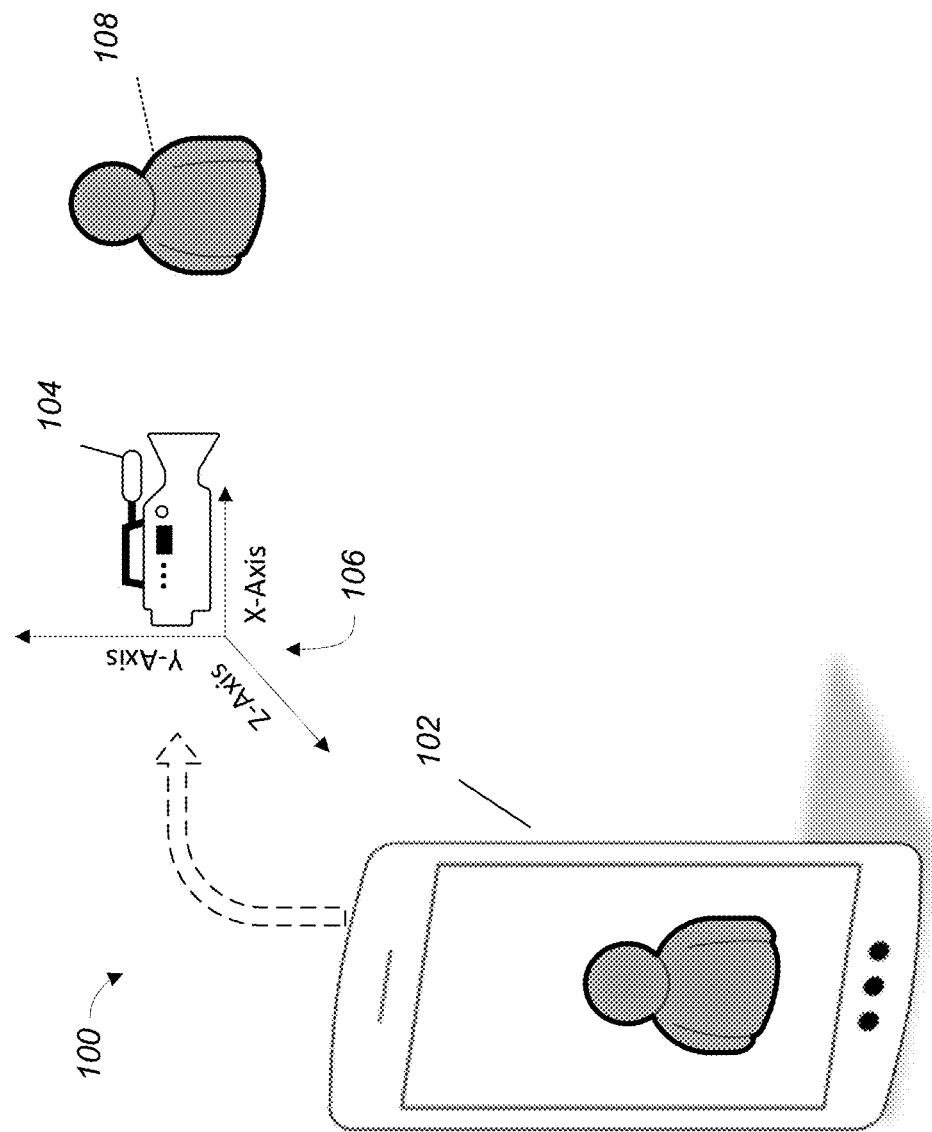
FIG. 1 illustrates a block diagram of the components of a system for capturing an image and corresponding AR data, according to various embodiments.

In the following detailed description, reference is made to the accompanying drawings which form a part hereof, and in which are shown by way of illustration embodiments that may be practiced. It is to be understood that other embodiments may be utilized and structural or logical changes may be made without departing from the scope. Therefore, the following detailed description is not to be taken in a limiting sense, and the scope of embodiments is defined by the appended claims and their equivalents.

Various operations may be described as multiple discrete operations in turn, in a manner that may be helpful in understanding embodiments; however, the order of description should not be construed to imply that these operations are order dependent.

The description may use perspective-based descriptions such as up/down, back/front, and top/bottom. Such descriptions are merely used to facilitate the discussion and are not intended to restrict the application of disclosed embodiments.

The terms "coupled" and "connected," along with their derivatives, may be used. It should be understood that these terms are not intended as synonyms for each other. Rather, in particular embodiments, "connected" may be used to indicate that two or more elements are in direct physical contact with each other. "Coupled" may mean that two or more elements are in direct physical contact. However, "coupled" may also mean that two or more elements are not in direct contact with each other, but yet still cooperate or interact with each other.

For the purposes of the description, a phrase in the form "A/B" or in the form "A and/or B" means (A), (B), or (A and B). For the purposes of the description, a phrase in the form "at least one of A, B, and C" means (A), (B), (C), (A and B), (A and C), (B and C), or (A, B and C). For the purposes of the description, a phrase in the form "(A)B" means (B) or (AB) that is, A is an optional element.

The description may use the terms "embodiment" or "embodiments," which may each refer to one or more of the same or different embodiments. Furthermore, the terms "comprising," "including," "having," and the like, as used with respect to embodiments, are synonymous.

Images and/or video of a scene stored with associated AR information can enable the image/video to be subsequently used for the recreation of a previous AR scene, generation of a new AR scene, and/or any desired post-capture analysis. The quality of the AR data depends upon the quality of the captured image or video, as well as the method used to calculate the AR data. The AR information typically includes a point cloud, which in most embodiments is essentially a series of coordinates within a 3D space that correspond to points on various features detected within the scene. AR data such as a point cloud may be obtained via a number of different techniques. For example, a still image may be captured along with data from a depth sensor to provide information for the point cloud, provided the capturing device includes a depth sensor such as a stereoscopic camera, IR depth camera, LIDAR sensor, or similar suitable technology. For a typical handheld device such as a smartphone, depth information may instead or additionally be determined using a visible light camera, such as the rear or front facing cameras typically equipped to a smartphone. Where a visible light camera is used, two frames taken of a given scene at slightly different perspectives can be used to derive depth data and/or a point cloud by using photogrammetric techniques, such as stereophotogrammetry. These two frames may come from a video stream, which itself is comprised of a series of progressive frames.

The point cloud further may include information about the confidence of each point, e.g. the degree to which the presence/location of the point is deemed accurate. This confidence value can depend on various factors, such as the quality of the sensor used to capture the scene, the number of frames captured and used to generate the point cloud, point of view variances between frames, additional sensor information captured contemporaneously with the scene that reflects the orientation and movement of the capturing device, the algorithm(s) used to calculate the point cloud, and/or any other considerations that can impact accuracy of a given point.

Typically, for stereophotogrammetric methods, use of a greater number of frames can result in points that have a higher confidence value as compared to point generated from only two or three frames. To the extent a captured scene is relatively static, e.g. no changes in features such as walls, windows, structures, furniture, and/or any other features that impact the 3D configuration of the space of the scene, these additional scenes need not be captured contemporaneously. For example, a first point cloud for a scene may be generated by a first device, such as a smartphone, from a single video capture. At a later point in time, a second device may capture the same scene, and use the capture to generate a second point cloud for the scene. The first and second point clouds, each derived from a single capture, may have comparable confidence values for the various points.

By recognizing that the first and second point clouds are derived from the same scene and thus combining the two point clouds, a single point cloud can be derived that is potentially more accurate than either the first or second point clouds. The single point cloud may not only include additional points over either of the first or second point clouds (to the extent that the first and/or second point clouds include unique points), but the confidence value of the various points may be greater than the values of either the first or second point clouds as a result of a cross check and/or correlation of points common between the first and second clouds. In some cases, the second capture of the scene may be from a different perspective and/or angle from the first capture. The different perspective may allow for additional points to be identified from features that may have been at least partially obscured from the first capture, or points to be more accurately identified in the second capture as compared to the first capture.

Embodiments disclosed herein are thus directed to updating a previously stored point cloud for a scene at a given location with information from subsequent captures. One or more subsequent captures may be identified as capturing the same scene as an initial capture that is stored with an associated point cloud. This identification may be accomplished by a variety of different techniques, such as reference to a location tagged to each capture (including the direction and orientation of the camera), similarity of identified objects in each capture, similarity of any patterns in the point cloud, indications by a user (such as the person capturing the scene), or any other suitable method or a combination of methods.

FIG. 1 illustrates an example system 100 that may enable capture of an image or video that includes AR data. System 100 may include a consumer device 102. In the depicted embodiment of FIG. 1, consumer device 102 is a smartphone, which may be implemented as a computer device 500, to be discussed in greater detail below with respect to FIG. 5. Although device 102 is labeled as a consumer device, this should not be taken as limiting; device 102 could be used by any person, including both consumers and providers of services. Other embodiments may implement device 102 as a variety of different possible devices, such as a computer (desktop or laptop), tablet, two-in-one, hybrid, smart glasses, or any other computing device that can accept a camera and provide necessary positional information, as will be discussed in greater detail herein. Consumer device 102 further may include a camera 104 and a spatial position sensor 106 (depicted by a series of axes), which provides information about the spatial position of camera 104. It will be understood that camera 104 and spatial position sensor 106 may be contained within the body of device 102. Camera 104 is used to capture the surrounding environment of device 102, and by extension, the user. The environment may include three-dimensional objects 108.

Camera 104 may be any camera that can provide a suitable video stream for the intended purpose of consumer device 102. Where consumer device 102 is implemented as a smartphone or tablet, camera 104 may be a built-in camera. In other embodiments, such as where consumer device is a laptop, camera 106 may be built in or a separate, external unit. A suitable video stream may be a digital video stream, and may be compressed in embodiments with some form of video compression, such as AVC-HD, H.264, MPEG-4, or another suitable compression scheme. Camera 104 may be configured to output standard or high-definition video, 4K video, or another resolution of video suitable for the intended purpose of camera 104 and consumer device 102.

Spatial position sensor 106 may be configured to provide positional information about camera 104, such as camera 104's pan and tilt. Other measured positional vectors may include camera movements, such as the camera rising, falling, panning, or moving/translating laterally. Spatial position sensor 106 may be implemented with micro or MEMS sensors, such as gyroscopes to measure angular movements, such as panning, and accelerometers to measure linear movements such as rises, falls, and lateral movements. In other embodiments, spatial position sensor 106 may be implemented using any suitable technology capable of measuring spatial movements of the camera, including but not limited to depth sensors 104.

Consumer device 102 may include one or more other sensors (not depicted) suitable for capturing a scene that is to be used in AR. Such sensors may include depth sensors, such as an infrared array, a 3D camera, an ultrasonic transceiver, a LI DAR sensor, or another suitable sensor technology that is capable of detecting one or more depth points in a captured scene. In some embodiments, the sensor may be capable of providing a map of depth points, which may be suitable for use as a point cloud with minimal processing. These sensors may be used in tandem with camera 104, spatial position sensor 106, and any other suitable sensor.

In embodiments, consumer device 102 is adapted to process a captured scene and obtain an associated point cloud for use in AR applications. The point cloud may be derived using photogrammetric techniques, directly measured by use of a dedicated depth sensor, by another suitable algorithm, by a combination of one or more of the foregoing, or any other suitable technique that will provide useful AR information now known or later developed. Consumer device 102 may directly (e.g. locally on the device) process the captured scene to calculate the AR data, or in other embodiments may upload the scene to a remote server for processing and calculation of the AR data. Processing of the captured scene may be accomplished by dedicated hardware within consumer device 102, by software, or a combination of both.

Figure 2:
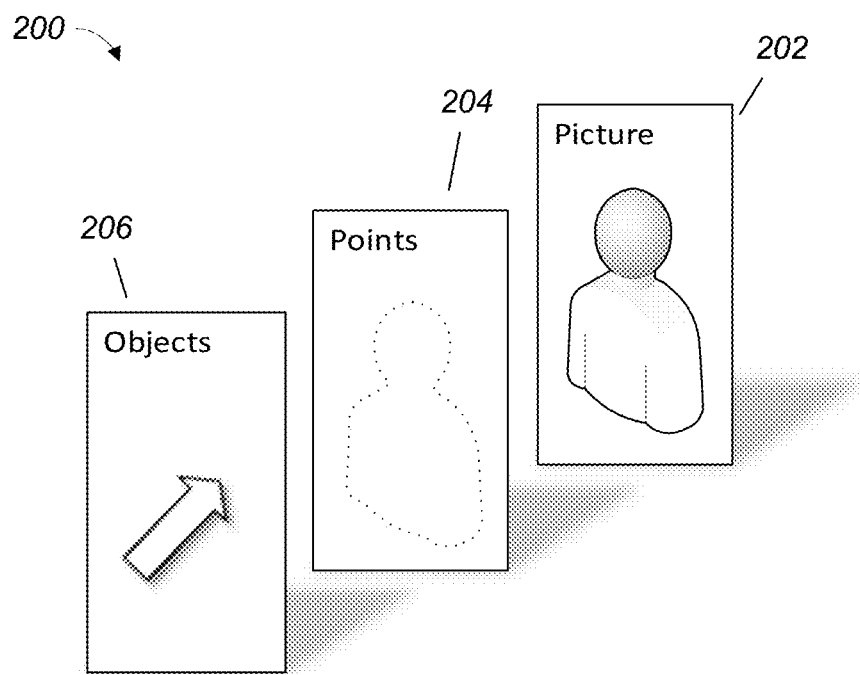
FIG. 2 depicts the various layers of a layered file format that may be utilized to store an image or video with associated AR data, according to various embodiments.

FIG. 2 depicts a possible embodiment of a file structure 200 for storing AR data associated with a video or image that may be used with the methods and techniques disclosed herein. File structure 200 and associated capture methods are described in greater detail in U.S. patent application Ser. No. 16/222,659, filed on 17 Dec. 2018, which is incorporated by this reference as if fully set forth herein. An initial layer 202 may comprise a captured figure or video obtained from consumer device 102, or some other suitable device. The captured figure may be of any image type now known or later developed that is suitable for the intended purposes of the captured figure. Formats may include bitmap, GIF, PNG, JPEG, JPEG 2000, or other similar image storage types. The x,y dimensions of the captured frame may define a particular viewpoint for subsequent 3D approximation construction and placement of virtual objects.

Layer 204, in embodiments, comprises the feature point cloud and associated spatial information. The point cloud and spatial information (collectively, data) may correspond to detected features within the captured frame and, where the point cloud is derived from a video, the point cloud and spatial information may also include data extrapolated from the surrounding frames in the video stream. As discussed above, in embodiments the data comprises a collection of points identified by x,y dimensions with respect to the captured figure or video in layer 202, includes a z dimension corresponding to the calculated or measured depth from the camera position, and may include a confidence value relating to the accuracy of the z measurement. This information may logically overlay upon initial layer 202, to provide depth information and anchor points for the placement of virtual objects.

As will be understood, in embodiments, the x, y, and z dimensions are expressed with respect to some external reference. In some embodiments, this external reference is the position of the device capturing the scene, and may further include data that allows the AR data values to be correlated to movements of the external reference, e.g. pan, tilt, translation, etc., that would be reflected in the image of the captured scene. In other embodiments, the external reference may be a point within or proximate to the scene, such as a series of GPS-obtained coordinates. In any case, the external reference may be stored in the file structure 200, such as in layer 204 or layer 202. This external reference may be used for subsequent augmentation of the point cloud or other AR data, as will be discussed below. Although Cartesian coordinates are used above, this is merely an example; other embodiments may employ other types of coordinate systems, such as polar coordinates.

The format for layer 204 may depend upon the nature of the information and implementing system, and so may be highly variable. Any suitable file format capable of reliably storing the feature point cloud and associated spatial information may be employed. Some possible examples for storage of the data include XML, bitmap, hash table, relational or flat file database, or any other suitable way of organizing the point cloud and spatial information data so that it may be readily retrieved for processing. Each point in the feature point cloud may identify in a 3D space, and may include X and Y coordinates (or values of another coordinate system, as mentioned above) within the picture image, as well as depth information, which may be represented by a Z coordinate. As will be discussed further herein, layer 204 may be augmented and/or supplemented subsequent to capture and detection by additional AR points derived from later captures of the same or a similar environment.

Layer 206 may comprise information about any overlaid virtual objects from the video stream. In the depiction of layer 206, an arrow is shown. The information may include the position, shape, size and orientation of the shape within the 3D approximation that may be constructed from the layer 204 information. Although only a single object is depicted, a plurality of objects may be stored in layer 206, including for objects that only partially may be visible from the view defined by the captured frame. Further, layer 206 may be empty where the captured frame has no virtual objects in view, or no virtual objects have been placed. As will be understood, the objects of layer 206 may be described with reference to one or more points in the point cloud or other AR data.

With the separate layers of captured information, file structure 200 may provide the ability to reconstruct the original AR scene at the time of capture, while maintaining all "clean" image data as originally captured by camera 104. This reconstruction may be useful for future review and/or training purposes, depending upon the intended purpose of the layered file. The presence of layer 204, with the feature point cloud and spatial data, may also allow measurements and 3D renderings of the captured scene to be subsequently calculated. In addition or alternatively to the virtual objects of layer 206, the combination of layer 202 and 204 data may allow for placement and manipulation of different or modified virtual object(s) upon the captured frame. For example, the AR objects in layer 206 may be ignored or omitted, and substituted with other AR objects.

The aforementioned layers 202, 204, and 206 are only three possible layers, according to various embodiments. Other embodiments may include additional layers, such as data streams from multiple sensors (e.g. a stream from a visible light camera and a stream from an infrared camera), other metadata, tagged information (e.g. a text data that is relevant to the captured scene, and/or other data that may be relevant to store with the captured scene. Still other embodiments may include fewer layers, such as omitting layer 206 entirely where no 3D AR objects are present, or layers are merged, e.g. object data is incorporated in to the AR data of layer 204.

Figure 3:
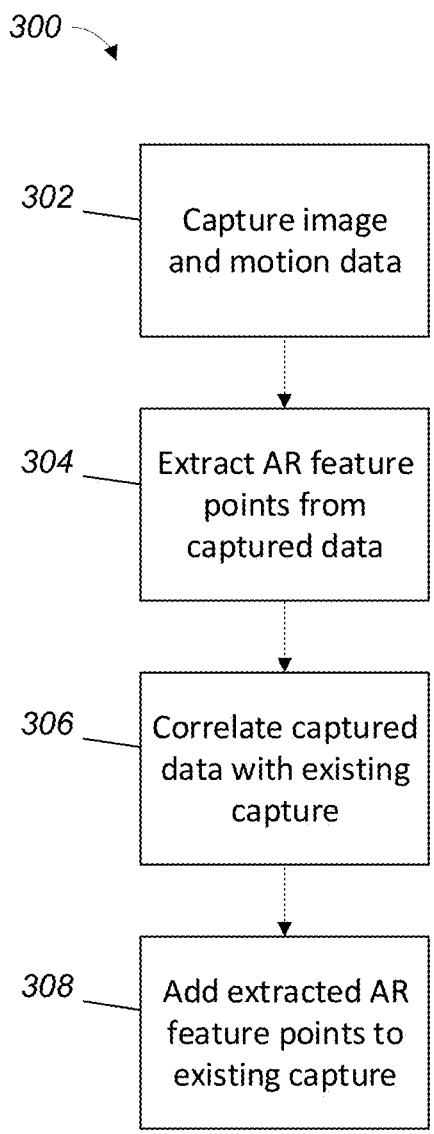
FIG. 3 is a flowchart of a method for augmenting preexisting AR data associated with an image or video with subsequently captured data, according to various embodiments.

FIG. 3 depicts a method 300 for augmenting an existing 3D point cloud with subsequently captured data. In embodiments, method 300 may be carried out, in whole or in part, by a consumer device 102. In other embodiments, at least part of method 300 may be carried out by a remote server, such as a cloud service. In some embodiments, consumer device 102 may upload the data to the remote server. In other embodiments, the remote server may initiate the method with consumer device 102. The remote server, in such embodiments, may be any device remote from consumer device 102, such as a data center, stand-alone remote server or cluster, Internet-accessible cloud service, private cloud service, or another similarly suitable type of remote system.

In block 302, an image, such as a still frame or a video, may be captured subsequent to the source image for the existing point cloud, along with associated motion data as described above with respect to FIGS. 1 and 2. The captured image may be identical to the source image or video used to generate the existing 3D point cloud, or may be similar, such as of the same location and/or subject, but from a different angle or point of view. The image may be captured by a consumer device 102 that is also carrying out method 300, or may be captured by a separate device or source unrelated to method 300, as will be discussed below.

The captured image may come from a variety of sources. In some examples, the original camera 104 used to capture the initial source image or video may be used to capture the subsequent image or video. In other examples, a different device or devices may be used to capture the subsequent image or video. In still other examples, the video or image may be captured (or capture of the image initiated) by a remote trigger. Specifically, a third party may remotely initiate a capture of the image or video on a user's device, such as where the user and third party are engaged in a communications session, and the third party triggers a capture of the video (and corresponding analysis to calculate AR data) from the user's device. In some such examples, the user and third party may be engaged in an AR session where the third party is placing objects in a video stream from the user's device. The user's device in such an example may already by calculating corresponding AR data; the third party may then trigger the user's device to upload the image and AR data to a cloud service. Alternatively, the cloud service may be facilitating the communications session between the user and the third party, and the third party may trigger the cloud service to record a portion of the session, comprised of at least a portion of the relayed video stream and corresponding point cloud. Regardless of the device used for the subsequent capture, the subsequently captured image need not be of the same type and format as the initial source image, viz. the source image may be a still frame, and the subsequent image may be a video, and vice-versa.

In still other examples, the subsequently captured image may be from a different source, such as a different user. For example, videos and/or still images may be uploaded by members of the general public to a central repository, such as a cloud service. The cloud service may then process the uploaded files per method 300. Such an approach can effectively provide crowd-sourced data to supplement point clouds. In some embodiments, the uploaded images may also include point cloud data generated by the capturing device. In other embodiments, the uploaded images may be processed by the cloud service to calculate at least some of the point cloud, such as by using photogrammetric techniques. It should be understood that "cloud service" as used here is not intended to be limiting to a specific type of service, but rather any server, data center, or other suitable facility that is remote from the capture device.

In block 304, AR feature points may be extracted from the subsequently captured image, also as described with respect to FIGS. 1 and 2 and U.S. patent application Ser. No. 16/222,659, incorporated by reference above. In some embodiments, as with the source image, a spatial position sensor may capture spatial information to relate to the spatial position of the device capturing the subsequent image. Likewise, in some embodiments, software and/or hardware may process the subsequent capture and perform detection of objects and surfaces to establish anchor points. This detection may result in a feature point cloud related to the subsequent capture. Where the subsequent capture is a video stream, feature points contemporaneous with other frames before and/or after the captured image may also be captured, and may be used to further enhance the feature points captured and associated with the captured image. As discussed above, this processing may occur either in the capturing device, or on a remote server. In some embodiments, the remote server may be the server storing the initial capture and AR data. In some embodiments, block 304 is carried out by the consumer device 102 that is also capturing the video or image in block 302. For example, consumer device 102 may include a software layer, a dedicated hardware block, or a combination of the foregoing, that processes the video or image as it is captured and computes/updates a point cloud. An example of such a software layer is Apple's ARKit, which runs on the iOS platform, or Google's ARCore, which runs on the Android platform.

In block 306, the subsequent capture and its associated 3D point cloud may be correlated with the source capture and point cloud. In some embodiments, the point cloud associated with each capture may be expressed via an x-y-z coordinate system that is referenced with respect to the capture. Correlation may allow establishing of a single or common coordinate system between captured images so that their corresponding point clouds may be properly merged. Without correlation, the point cloud of the subsequent capture may not properly align in space with the point cloud of the source capture. Further, correlation may also serve as verification that the subsequent capture is directed to the same scene as the original source capture. As with blocks 302 and 304, in some examples block 306 is carried out by the consumer device 102 executing all blocks of method 300. In other examples, block 306 may be executed by a remote server or system from an upload of a video or image and AR data captured and calculated in blocks 302 and 304, respectively. In still other examples, blocks 304 and 306 may be carried out by the remote server, with consumer device 102 uploaded the video or image it captured in block 302.

Correlation may be accomplished by a variety of methods. For example, some embodiments may employ object matching between captures. An anchor point or object in the source capture may be determined and/or selected, which is then located within the subsequent capture to tie the images together. The anchor point may be one of the points in the AR data point cloud, or may be a different point identified in the scene. Such anchor point may be determined via object recognition, particularly if the source capture includes a particularly unique object or feature that may be readily identified. Identifying an anchor point provides a common reference point between the source and subsequent captures from which the respective coordinate systems can be aligned and translated. Other possible embodiments of this nature include a unique visual tag that is part of the frame that is easily recognized by an image recognition algorithm. Such a tag may have predefined physical characteristics, such as shape and dimensions. Distance and orientation to the tag may then be determined by comparing the known characteristics with the captured image.

Other examples may use different techniques for correlation. In another embodiment, geolocation services such as GPS may be used to determine that the subsequent capture is taken in approximately the same location as the source capture. Combined with orientation information such as may be provided by a compass, to correlate the direction the camera is pointing, and a gyroscope, to correlate the spatial orientation of the camera (e.g. whether the camera was tilted up, down, left, and/or right), it can be established that the devices capturing the source and subsequent images, respectively, were in approximately the same location and facing approximately the same direction. By determining such device orientation, it may not be necessary to establish a single unique anchor point, as the location and orientation of each device may provide sufficient common reference information to derive a common coordinate system. Geolocation may also be supplemented or alternatively determined on the basis of known nearby markers, such as radio beacons like WiFi hotspots, NFC/RFID readers, Bluetooth, etc.

Figure 4:
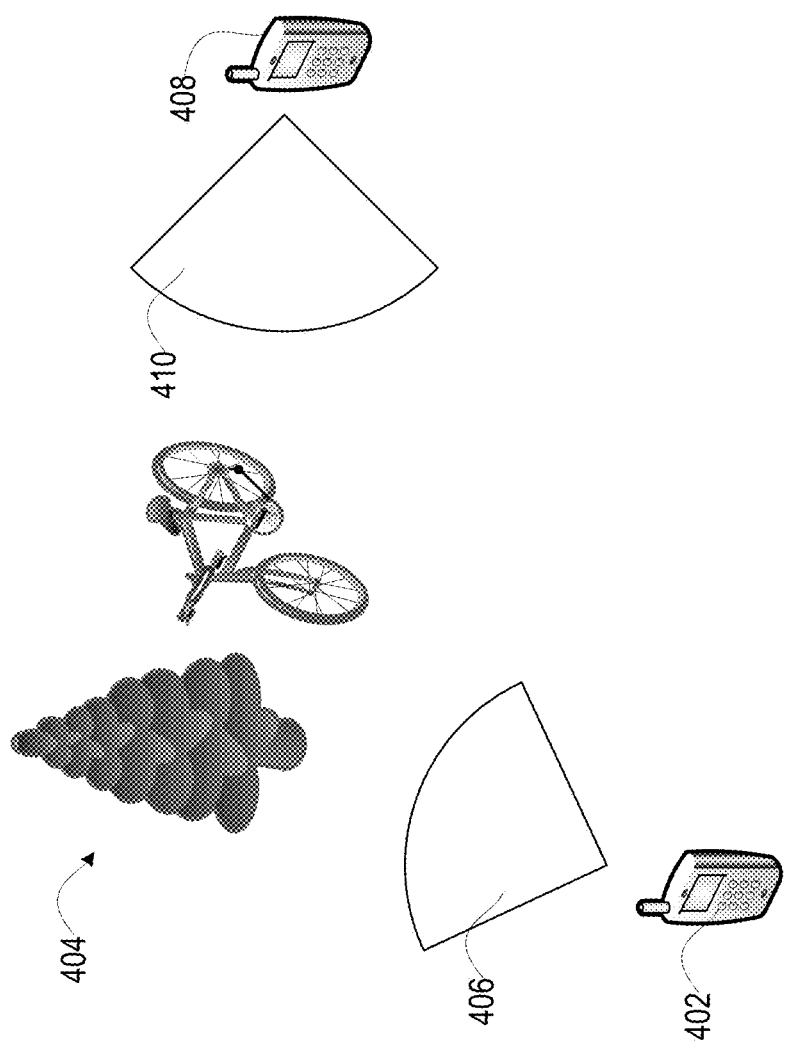
FIG. 4 is a diagram of a scene illustrating capture by two different cameras from different perspectives.

In some instances, a point cloud (or similar AR data) generated from the subsequent capture may be compared with the existing stored point cloud/AR data, essentially employing one or more of the points in the point cloud as anchor points. Such a technique may be useful for correlating the AR data from captures obtained from two different perspectives. For example, FIG. 4 depicts such an arrangement. In FIG. 4, a first device 402 is used to capture a scene 404 at a first perspective 406. As can be seen, first perspective 406 would present a tree with a bicycle disposed approximately to the right of the tree. A second device 408 may capture the same scene at a different time, at a second perspective 410. Second perspective 410, in contrast to first perspective 406, would present the bicycle approximately in front of the tree. A point cloud generated by first device 402 may not include points for the rear portion of the bicycle, which would be generated by second device 408. However, both first device 402 and second device 408 may generate one or more points corresponding to the top portion of the tree visible to both devices as well as the front portion of the bicycle.

Points generated from the commonly visible portions by both first device 402 and second device 408 are likely to correspond to similar, if not identical, positions on the commonly visible portions. As such, these points can be useful for correlating the AR data generated by the first device 402 with the AR data generated by the second device 408. This correlation may be assisted by knowledge of the orientation of each of first device 402 and second device 408. Incorporation of GPS data would indicate that first device 402 and second device 408 are relatively proximate. By including heading information (such as may be available via a magnetic compass), altitude data (which may be supplied by GPS or a barometric sensor, for example), and gyroscope data to determine each device's angular orientation, it can be determined that both first device 402 and second device 408 are facing the same scene 404. Thus, the point clouds from first device 402 and second device 408 are likely to include common points, and so may be correlated.

Still other embodiments may use a combination of the foregoing, or may allow a user to manually indicate when a source and subsequent capture are of identical or similar scenes, as well as other characteristics, such as designating a common anchor point. In some embodiments, a user providing the subsequent capture may specifically/manually indicate a location for the capture, and/or may select a specific source capture to augment with a subsequent capture. The user may, in some embodiments, supply additional information about the perspective of the subsequent capture relative to the captured scene.

It will be appreciated by a person skilled in the relevant art that some methods of correlation may be more suitable when aspects of the environment vary between source and subsequent captures. For example, if furniture and/or decorations are altered somewhat between the time of the source capture and subsequent capture, a correlation method that does not exclusively rely upon an anchor point (which may have been moved or removed between captures) may still allow captures to be correlated. Other examples may determine multiple possible anchor points, such as creating a "fingerprint" of a scene, that will allow for accurate correlation even if one or more anchor points change between the source and subsequent captures.

In block 308, once the source and subsequent captures are correlated, their respective 3-D point clouds may be merged to result in a single augmented point cloud, potentially with a common coordinate system relative to a single external reference, or coordinate systems that can be interchangeable converted between different external reference points. Where the captures are relatively identical and unchanged, this may amount to little more than adding additional points from the subsequent capture's point cloud that aren't present in the source capture's cloud. Where the angles and/or perspectives of the captures differ somewhat, points in one point cloud may need to be transformed to the coordinate system of the other point cloud to facilitate merging. In addition to merging, in some embodiments the confidence values may be used to generate a more accurate point cloud. For example, where a point commonly shared between captures has differing data in at least one of the x, y, and z axes, the values from the point that has a higher confidence value may be adopted over the point data with the lower confidence value. Where method 300 is carried out entirely by consumer device 102, block 408 may involve consumer device 102 updating an image or video stored upon consumer device 102 (or otherwise accessible to consumer device 102, such as with a video or image stored remotely, e.g. on a cloud service). In some such examples, the updated or augmented AR data of the existing capture may be stored on consumer device 102 (or uploaded/updated by consumer device 102 to the cloud service). In other examples, block 408 may be carried out by a remote server that also executes block 406. In still other examples, only block 408 may be carried out by a second remote system, separate or independent from the remote system that carried out block 406.

Referring again to the example of FIG. 4, second device 408 presents a second perspective 410 that is approximately 90 degrees from first perspective 406. With knowledge of the heading and orientation of second device 408 relative to first device 402, the x, y, and/or z data of each point in the correlated point clouds can be translated to the frame of reference for first device 402. This enables the augmented point cloud to be used from a wider range of perspectives as compared with a point cloud derived only from a single device.

In another example, where the captures overlap to only a partial extent, only that portion of the subsequent capture's point cloud that overlaps may be merged to the source capture point cloud. Alternatively, the overlapping portion may be merged, and non-overlapping portions may be added, possibly in conjunction with stitching or adding on the non-overlapping portions of the captures. This could result in an expanded image and point cloud, greater than either the source or subsequent captures. The result of the merging process may yield a more robust and accurate point cloud that allows for better analysis and accurate placement of AR objects. As shown in FIG. 4, merging the point clouds from first device 402 with those from second device 408 can result in an expanded point cloud that includes information on features only visible by one of first device 402 and second device 408, thus resulting in a more complete and improved point cloud for the scene 404.

In some examples, objects appearing in a source capture may have been added, changed, or removed when compared to the subsequent capture. If one or more points corresponding to a removed or changed object are in the source capture point cloud, such points may become "orphaned" when compared to the subsequent capture point cloud. For such scenarios, the orphaned points may need to be removed from the source capture point cloud to prevent undesired behavior when AR objects are placed, or measurements are made. Likewise for changed or added objects, some points may need to be added into the augmented point cloud, and others deleted. Such a "culling" process can result in an augmented AR data or point cloud being kept up to date by way of periodic updates from new captures and augmentation of the existing point cloud.

Finally, it should be recognized that point clouds from multiple subsequent captures may be merged with the source capture point cloud, and that these subsequent captures may be from a variety of sources, e.g. crowdsourcing. For example, applying the techniques disclosed herein from crowd-sourced images for popular public locations can result in a dense and highly accurate point cloud for a potentially large and panoramic area. Such a point cloud in conjunction with multiple captured images may enable highly accurate placement of AR objects. Although an initial and subsequent captures are described above, it should be understood that multiple subsequent captures at varying times may be used to supplement an initial capture, or a capture that itself has been previously supplemented.

Still further, one or more AR objects from the subsequent capture may also be incorporated into source or initial capture. Alternatively or additionally, the image or video of the subsequent capture may be incorporated into a file including the AR data, such as file structure 200. The image from the subsequent capture may be incorporated into the AR data as an additional layer, for example, or may be amended into or used to substitute the existing image from the initial capture.

Figure 5:
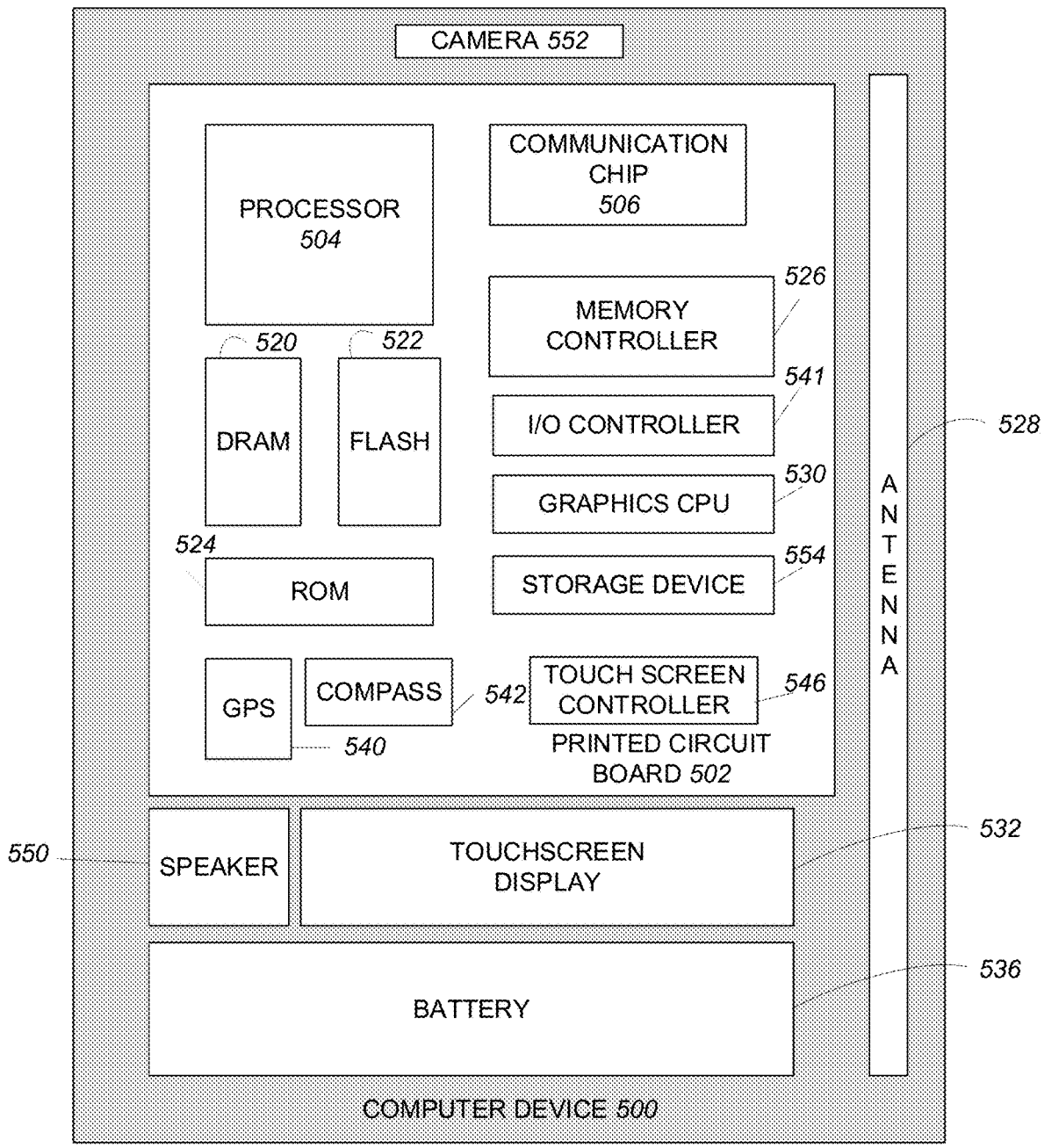
FIG. 5 is a block diagram of an example computer that can be used to implement some or all of the components of the system of FIG. 1.

FIG. 5 illustrates an example computer device 500 that may be employed by the apparatuses and/or methods described herein, in accordance with various embodiments. As shown, computer device 500 may include a number of components, such as one or more processor(s) 504 (one shown) and at least one communication chip 506. In various embodiments, the one or more processor(s) 504 each may include one or more processor cores. In various embodiments, the one or more processor(s) 504 may include hardware accelerators to complement the one or more processor cores. In various embodiments, the at least one communication chip 506 may be physically and electrically coupled to the one or more processor(s) 504. In further implementations, the communication chip 506 may be part of the one or more processor(s) 504. In various embodiments, computer device 500 may include printed circuit board (PCB) 502. For these embodiments, the one or more processor(s) 504 and communication chip 506 may be disposed thereon. In alternate embodiments, the various components may be coupled without the employment of PCB 502.

Depending on its applications, computer device 500 may include other components that may be physically and electrically coupled to the PCB 502. These other components may include, but are not limited to, memory controller 526, volatile memory (e.g., dynamic random access memory (DRAM) 520), non-volatile memory such as read only memory (ROM) 524, flash memory 522, storage device 554 (e.g., a hard-disk drive (HDD)), an I/O controller 541, a digital signal processor (not shown), a crypto processor (not shown), a graphics processor 530, one or more antennae 528, a display, a touch screen display 532, a touch screen controller 546, a battery 536, an audio codec (not shown), a video codec (not shown), a global positioning system (GPS) device 540, a compass 542, an accelerometer (not shown), a gyroscope (not shown), a speaker 550, a camera 552, and a mass storage device (such as hard disk drive, a solid state drive, compact disk (CD), digital versatile disk (DVD)) (not shown), and so forth.

In some embodiments, the one or more processor(s) 504, flash memory 522, and/or storage device 554 may include associated firmware (not shown) storing programming instructions configured to enable computer device 500, in response to execution of the programming instructions by one or more processor(s) 504, to practice all or selected aspects of the system 100 and method 200 described herein. In various embodiments, these aspects may additionally or alternatively be implemented using hardware separate from the one or more processor(s) 504, flash memory 522, or storage device 554.

The communication chips 506 may enable wired and/or wireless communications for the transfer of data to and from the computer device 500. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication chip 506 may implement any of a number of wireless standards or protocols, including but not limited to IEEE 802.20, Long Term Evolution (LTE), LTE Advanced (LTE-A), General Packet Radio Service (GPRS), Evolution Data Optimized (Ev-DO), Evolved High Speed Packet Access (HSPA+), Evolved High Speed Downlink Packet Access (HSDPA+), Evolved High Speed Uplink Packet Access (HSUPA+), Global System for Mobile Communications (GSM), Enhanced Data rates for GSM Evolution (EDGE), Code Division Multiple Access (CDMA), Time Division Multiple Access (TDMA), Digital Enhanced Cordless Telecommunications (DECT), Worldwide Interoperability for Microwave Access (WiMAX), Bluetooth, derivatives thereof, as well as any other wireless protocols that are designated as 3G, 4G, 5G, and beyond. The computer device 500 may include a plurality of communication chips 506. For instance, a first communication chip 506 may be dedicated to shorter range wireless communications such as Wi-Fi and Bluetooth, and a second communication chip 506 may be dedicated to longer range wireless communications such as GPS, EDGE, GPRS, CDMA, WiMAX, LTE, Ev-DO, and others.

In various implementations, the computer device 500 may be a laptop, a netbook, a notebook, an ultrabook, a smartphone, a computer tablet, a personal digital assistant (PDA), a desktop computer, smart glasses, or a server. In further implementations, the computer device 500 may be any other electronic device that processes data.

As will be appreciated by one skilled in the art, the present disclosure may be embodied as methods or computer program products. Accordingly, the present disclosure, in addition to being embodied in hardware as earlier described, may take the form of an entirely software embodiment (including firmware, resident software, micro-code, etc.) or an embodiment combining software and hardware aspects that may all generally be referred to as a "circuit," "module" or "system." Furthermore, the present disclosure may take the form of a computer program product embodied in any tangible or non-transitory medium of expression having computer-usable program code embodied in the medium. FIG. 6 illustrates an example computer-readable non-transitory storage medium that may be suitable for use to store instructions that cause an apparatus, in response to execution of the instructions by the apparatus, to practice selected aspects of the present disclosure. As shown, non-transitory computer-readable storage medium 602 may include a number of programming instructions 604. Programming instructions 604 may be configured to enable a device, e.g., computer 500, in response to execution of the programming instructions, to implement (aspects of) system 100, file structure 200, and method 300. In alternate embodiments, programming instructions 604 may be disposed on multiple computer-readable non-transitory storage media 602 instead. In still other embodiments, programming instructions 604 may be disposed on computer-readable transitory storage media 602, such as, signals.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope. Those with skill in the art will readily appreciate that embodiments may be implemented in a very wide variety of ways.

This application is intended to cover any adaptations or variations of the embodiments discussed herein. Therefore, it is manifestly intended that embodiments be limited only by the claims and the equivalents thereof.

What is claimed is:

1. A method for augmenting a captured augmented reality (AR) image file, comprising:
providing an AR image file, the AR image file including a point cloud and capture location information;
capturing, with a user device, an image and user device location information;
calculating, by the user device, one or more depth points to objects detected in the image;
correlating the capture location information with the user device location information; and
updating the point cloud with the one or more depth points.

2. The method of claim 1, wherein the image comprises a video.

3. The method of claim 1, wherein updating the point cloud comprises determining at least one point in the point cloud to delete, at least one point in the point cloud to modify with one of the one or more depth points, or a depth point from the one or more depth points to add to the point cloud.

4. The method of claim 1, wherein the point cloud is comprised of one or more points, and each point in the point cloud and each of the one or more depth points is associated with a confidence value.

5. The method of claim 4, wherein the confidence value of a point of the one or more depth points is compared with the confidence value of a point in the point cloud that correlates to the point of the one or more depth points, and the point with the lower confidence value is discarded.

6. The method of claim 1, further comprising comparing, prior to updating the point cloud, an orientation of the user device with an orientation associated with the AR image file.

7. A non-transitory computer-readable medium (CRM) comprising instructions that, when executed by an apparatus, cause the apparatus to:

receive a video and location information for a user device that captured the video;

retrieve AR data and associated capture location information from a data store in communication with the apparatus;

calculate one or more depth points to objects detected in the video;

correlate the capture location information with the user device location information; and update the AR data with the one or more depth points.

8. The CRM of claim 7, wherein the apparatus comprises a cloud-based server.

9. The CRM of claim 7, wherein the instructions to cause the apparatus to update the AR data are to further cause the apparatus to determine at least one point in the AR data to delete, at least one point in the AR data to modify with one of the one or more depth points, or a depth point from the one or more depth points to add to the AR data.

10. The CRM of claim 7, wherein the AR data is comprised of one or more points, and each point in the AR data and each of the one or more depth points is associated with a confidence value.

11. The CRM of claim 10, wherein the instructions are to further cause the apparatus to compare the confidence value of a point of the one or more depth points with the confidence value of a point in the AR data that correlates to the point of the one or more depth points, and discard the point with the lower confidence value.

12. The CRM of claim 7, wherein the instructions are to further cause the apparatus to compare an orientation of the user device with an orientation associated with the AR image file.

* * * * *